US012676439B2

(12) United States Patent
Kumar et al.

(10) Patent No.: US 12,676,439 B2
(45) Date of Patent: Jul. 7, 2026

(54) CANTILEVER CONTACT SUPPORT USING MEMORY METAL STRUCTURE

(71) Applicant: International Business Machines Corporation, Armonk, NY (US)

(72) Inventors: Anjali Kalpesh Kumar, Rochester, MN (US); Theron Lee Lewis, Rochester, MN (US); Abdikarim Hussein, Rochester, MN (US); Timothy Jennings, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 349 days.

(21) Appl. No.: 18/345,122

(22) Filed: Jun. 30, 2023

(65) Prior Publication Data

US 2025/0007196 A1 Jan. 2, 2025

(51) Int. Cl.
*H01R 13/15* (2006.01)
*H01R 12/71* (2011.01)
(Continued)

(52) U.S. Cl.
CPC ............. *H01R 13/15* (2013.01); *H01R 43/26* (2013.01); *H01R 12/716* (2013.01); *H01R 12/722* (2013.01); *H01R 13/112* (2013.01)

(58) Field of Classification Search
CPC ........ H01R 12/856; H01R 4/01; H01R 13/15; H01R 43/26; H01R 12/716; H01R 12/772; H01R 13/112
See application file for complete search history.

(56) References Cited

U.S. PATENT DOCUMENTS 3,783,429 A 1/1974 Otte et al.
4,487,465 A 12/1984 Cherian et al.
(Continued)

FOREIGN PATENT DOCUMENTS

EP 0363170 B1 8/1995
EP 3036800 B1 3/2019
(Continued)

OTHER PUBLICATIONS

Machine translation of WO 2022/248111.*
(Continued)

*Primary Examiner* — Renee S Luebke
*Assistant Examiner* — Paul D Baillargeon
(74) *Attorney, Agent, or Firm* — CHIP LAW GROUP

(57) ABSTRACT

An electrical connector structure is provided including a cantilever contact with a memory metal support that provides for improved cantilever contact mating. In one embodiment, the electrical contact structure includes cantilever beam having a contact portion for engaging a pin structure and a non-contact portion that is mechanical support with the contact portion. An insulated memory metal support beam is positioned adjacent to the non-contact portion of cantilever beam, wherein the insulated memory metal support beam transitions from a first geometry to a second geometry with the application of a transition element. The first geometry of the insulated memory metal support beam provides that the insulating memory metal support beam does not engage the non-contact portion of the cantilever beams. The second geometry of the insulated memory support beam contacts the non-contact portion of the cantilever beam producing a force that supports the contact portion of the cantilever contacts.

20 Claims, 10 Drawing Sheets

(51) Int. Cl.

| | |
|---|---|
| ***H01R 12/72*** | (2011.01) |
| ***H01R 13/11*** | (2006.01) |
| ***H01R 43/26*** | (2006.01) |

(56) References Cited

U.S. PATENT DOCUMENTS

| | | | | |
|---|---|---|---|---|
| 4,734,047 | A | 3/1988 | Krumme et al. | |
| 4,846,729 | A | 7/1989 | Hikami et al. | |
| 4,881,908 | A | 11/1989 | Perry et al. | |
| 5,092,781 | A | 3/1992 | Casciotti et al. | |
| 5,098,305 | A | 3/1992 | Krajewski et al. | |
| 5,105,178 | A | 4/1992 | Krumme et al. | |
| 5,151,056 | A | 9/1992 | McClune et al. | |
| 6,974,339 | B2 * | 12/2005 | Kuzmenka ......... | H01R 43/0242 439/161 |
| 11,108,180 | B2 | 8/2021 | Girard et al. | |
| 12,113,310 | B2 * | 10/2024 | Herdendorf .......... | H01R 12/856 |

FOREIGN PATENT DOCUMENTS

| | | | | |
|---|---|---|---|---|
| JP | H0590837 U | 12/1993 | | |
| WO | WO-2022248111 A1 * | 12/2022 | ............. | H01R 13/04 |

OTHER PUBLICATIONS

Mroczkowski, B. (Sep. 18, 2007) "Degradation Mechanisms—Loss in Contact Normal Force" https://connectorsupplier.com/degradation-mechanisms-loss-contact-normal-force/.

Memory Metal Paperclip Google Search (Retrieved on Apr. 26, 2023) https://www.google.com/search?q=memory+metal+paperclip.

Kulisic, I., Gray, G. L., & Mohney, S. E. (Oct. 26, 1998). Shape memory alloy coil-shaped clamp for enhanced normal force in electrical connectors. In Electrical Contacts—1998. Proceedings of the Forty-Fourth IEEE Holm Conference on Electrical Contacts (Cat. No. 98CB36238) (pp. 20-25). IEEE.

Shape-Memory Alloy Wikipedia Search (Retrieved on Apr. 26, 2023) https://en.wikipedia.org/wiki/Shape-memory_alloy.

* cited by examiner

CANTILEVER CONTACT SUPPORT USING MEMORY METAL STRUCTURE

BACKGROUND

The present invention generally relates to connectors in electrical devices, and more particularly to supporting cantilever beam connectors.

For making electrical connections with electrical components, such as electrical plugs and/or printed circuit boards (PCBs), it can desirable to provide socket contacts with two spaced-apart metal cantilever beams for gripping male contact posts. Cantilever beam connectors are fastening devise used to connect cantilever beams to supporting structures. They provide stability and transfer loads from the cantilever beam to the support. Cantilever beams can function similar to springs that apply a normal force to the mating contacts. A cantilever beam may include a minimum of two contact beams inside a mating window. However, in cantilever beam construction, the deformable beams employed to oppose the gripping force has a tendency to degrade with age and thereby reduce the life and reliability of the socket. It is also desirable to provide a compact socket structure, for space considerations typically require that the socket contacts be tightly stacked into overlaying rows adjacent one board edge.

SUMMARY

In one aspect, an electrical connector structure is provided including a cantilever contact with a memory metal support that provides for improved cantilever contact mating. In one embodiment, the electrical contact structure includes cantilever beam having a contact portion for engaging a pin structure and a non-contact portion that is mechanical support with the contact portion. An insulated memory metal support beam is positioned adjacent to the non-contact portion of cantilever beam, wherein the insulated memory metal support beam transitions from a first geometry to a second geometry with the application of a transition element. The first geometry of the insulated memory metal support beam provides that the insulating memory metal support beam does not engage the non-contact portion of the cantilever beams. The second geometry of the insulated memory support beam contacts the non-contact portion of the cantilever beam producing a force that supports the contact portion of the cantilever contacts.

In another embodiment, the electrical contact structure includes deformable contacts having a contact portion for engaging a pin structure and a non-contact portion that is mechanical support for the contact portion. A memory metal support beam is positioned adjacent to the non-contact portion of the deformable contacts, wherein the memory metal support beam transitions from a first geometry having a first curvature to a second geometry having a second curvature with the application of a transition element. The first curvature of the memory metal support does not engage the non-contact portion of the cantilever beams. The second curvature of the memory support beam contacts the non-contact portion of the cantilever beam.

In another aspect, a method for reinforcing contacts in electrical connectors is provided that includes positioning an insulated memory metal support beam adjacent to the non-contact portion of a cantilever beam. The cantilever beam includes a contact portion for engaging a pin structure that is mechanically supported by the non-contact portion. The method further includes engaging the pin structure to the contact portion of the cantilever beam, wherein engagement of the pin structure to the contact portion includes inducing a normal force from the cantilever beam on the pin structure. The method may further include applying a transition element to the insulated memory metal support beam, wherein the transition element induces a geometry change in the insulated memory metal support beam that causes the insulated memory metal support beam to apply a force to the cantilever beam that reinforces the normal force on the pin structure.

In another aspect, a method of providing mechanical support for cantilever beam connectors is provided. In one embodiment, the methods includes installing a male connector into a female connector that includes a memory metal support beams adjacent to deformable cantilever beams of the cantilever beam connector, wherein a contact portion of the deformable cantilever beams directly contacts the pin connector. Applying a transition temperature to the memory metal support beams, wherein the transition temperatures causes a geometry change in the memory metal support beams from a relaxed position to a reinforcing position, wherein the reinforcing position includes the memory metal support beam directly contacting the formable cantilever beams while the contact portion of the deformable cantilever beams is directly contacting the pin connector.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
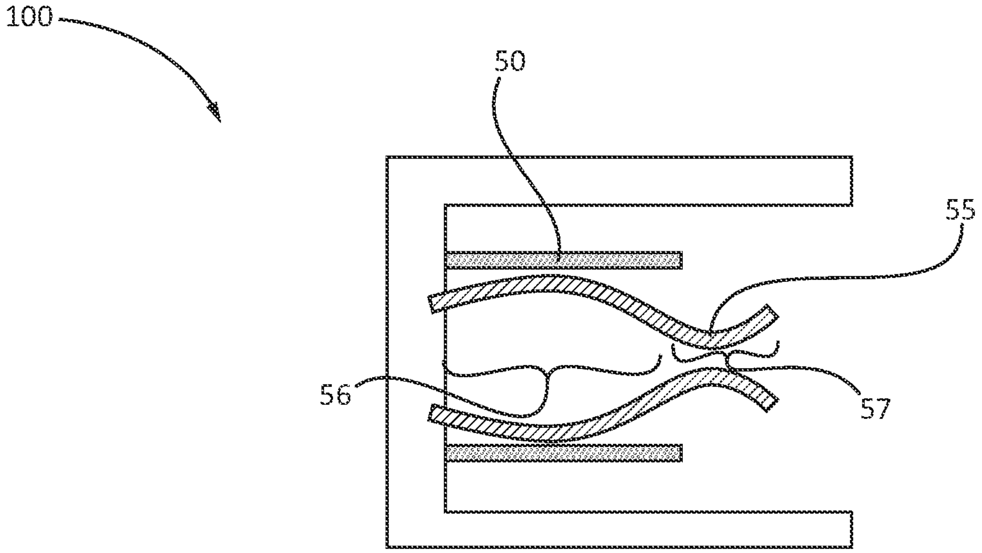
FIG. 1 is a side cross-sectional view illustrating one embodiment of a cantilever contact with a memory metal support beam that provides for improved cantilever contact mating, wherein the memory metal support beam transitions from a first geometry to a second geometry with the application of a transition element, in accordance with one embodiment of the present disclosure.

Detailed embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure. For purposes of the description hereinafter, the terms “upper”, “lower”, “right”, “left”, “vertical”, “horizontal”, “top”, “bottom”, and derivatives thereof shall relate to the embodiments of the disclosure, as it is oriented in the drawing figures. The terms “positioned on” means that a first element, such as a first structure, is present on a second element, such as a second structure, wherein intervening elements, such as an interface structure, e.g., interface layer, may be present between the first element and the second element. The term “direct contact” means that a first element, such as a first structure, and a second element, such as a second structure, are connected without any intermediary conducting, insulating or semiconductor layers at the interface of the two elements.

The methods and structures of the present disclosure are directed to electrical connectors including deformable beams, e.g., cantilever beams, for providing the electrical contact surfaces of the electrical connectors. The electrical contact structures disclosed herein employ memory metal support structures to mechanically support the deformable beams, e.g., cantilever beams. By providing mechanical support, the memory metal support structures provide for improved mating of the contacts to the electrical structures they are intended to provide electrical communication to.

It has been determined that as electrical connectors go through plug cycles, the contact normal force decreases over time. The contact normal force is a result of the deflection undergone of the receptable contact beam by the plug contact as its inserted into the connector. This force is what dominates the integrity and reliability of a connector. Loss of normal force may result from changes in temperature. As a connector is exposed to extended periods of elevated temperatures there can be an effect on the normal force interface material within the product. Loss of normal force may also result from the time the piece is in service. For example, even if the piece remains in the elastic region, some factors can still cause the normal force to decrease over time. If there is a constant force applied to the contact, over time stress relaxation will occur. Additionally multiple plug cycles can reduce the normal force. Connectors with higher normal force will have a low cycle life. Housing relaxation may also contribute to loss of normal force. High normal force is undesirable, because it increases mating forces, stresses on the contact springs/housings and wear. Over time, if the normal force degrades too much, electrical resistance may increase to insurmountable levels resulting in various circuit errors, signal errors, and other negative issues.

The methods and structures of the present disclosure integrate memory metals into the design of a connection such that the deflection undergone during mating cycles is counteracted. A memory metal would be used as small springs, constricting two adjacent contact beams or as a cantilever beam laying across all the contact cantilevered beams. As the contact beams are deflected during plugging (assembly of male and female electrical plugs), the memory metals normal force in a directional opposing the deflection of the cantilever beam would help return the cantilever beam to its original position, hence elongating the contact force of the overall connector, as well as increasing the connector’s reliability. The methods and structures of the present disclosure are now described in greater detail with reference to FIGS. 1-13.

Figure 2:
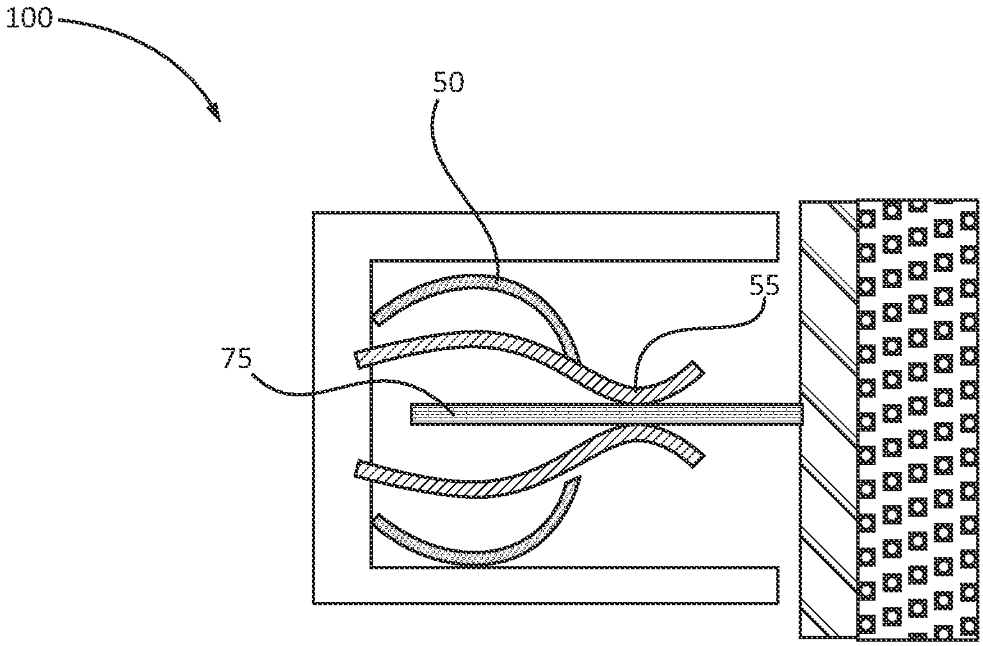
FIG. 2 is a side cross-sectional view illustrating one embodiment of a cantilever contact with a memory metal support beam, wherein the transition element has been applied to the memory support beam to provide that the memory metal support beam configures to the second geometry to provide that the memory metal support beam contacts the cantilever beam to product a force that reinforces the cantilever contact.

FIG. 1 illustrates one embodiment of a cantilever contact 100 with a memory metal support beam 50 that provides for improved cantilever contact mating, wherein the memory metal support beam 50 transitions from a first geometry to a second geometry with the application of a transition element. FIG. 1 illustrates the memory metal support beam 50 in its first geometry shape. FIG. 2 illustrates the cantilever contact 100 after the transition element has been applied to the memory support beam 50 to provide that the memory metal support beam 50 configures to the second geometry to provide that the memory metal support beam 50 contacts the cantilever beam 55 to product a force that reinforces the cantilever contact mating with a pin connector 75. As will be discussed in greater detail below, the transition element may be an application of heat or magnetic field that is applied to the memory metal support beam 50.

The term “memory metal” refers to a metal alloy composition that “remembers” its original shape, i.e., pre-deformed shape, and that when deformed returns to its pre-deformed shape when heat energy or magnetic energy is applied to it (depending on the alloy). The heat energy or magnetic energy is the “transition element”. For example, ferromagnetic shape-memory metals are the group of alloys that react to magnetic fields. In some embodiments, the composition for the memory metal that is employed in the memory metal support beam 50 is a composition in the copper-aluminum-nickel alloy type or the composition is in nickel-titanium (NiTi) alloy type. However, memory shape metals can also be created by alloying zinc, copper, gold and iron. Memory shape metals can exist in two different phases, with three different crystal structures (i.e. twinned martensite, detwinned martensite, and austenite) and six possible transformations. The thermo-mechanic behavior of the memory shaped metals is governed by a phase transformation between the austenite and the martensite.

Figure 3:
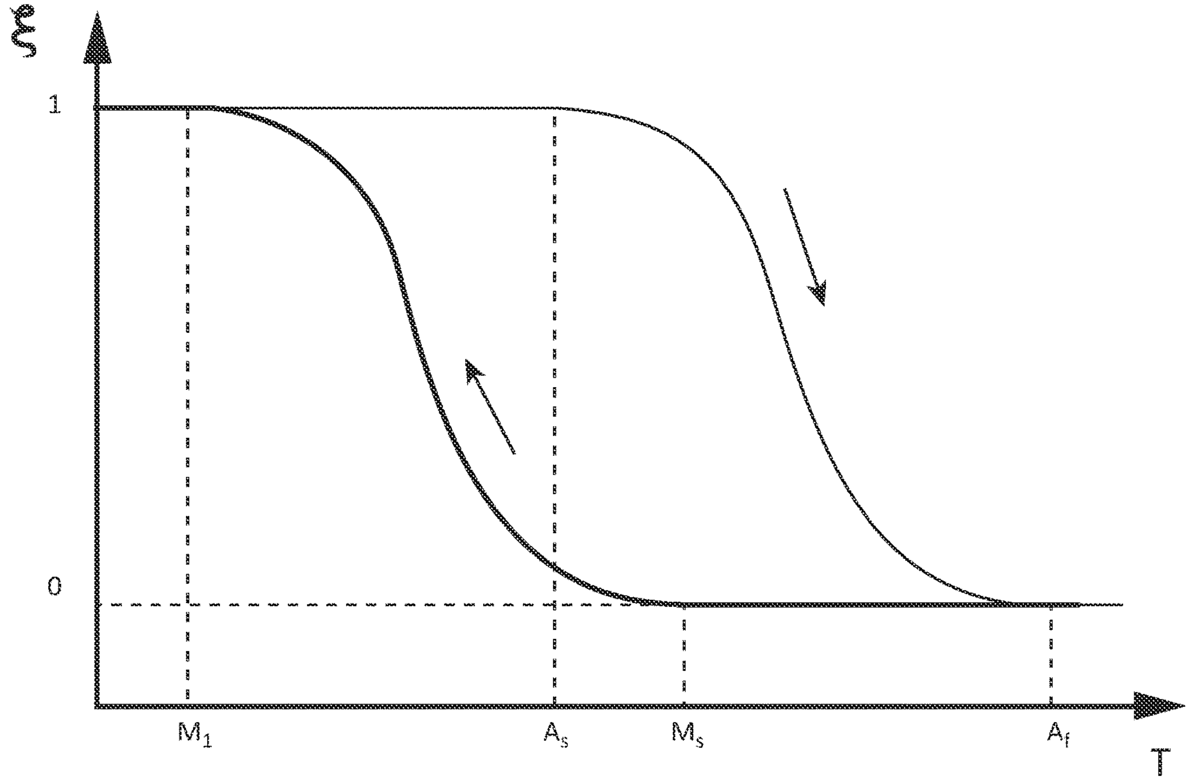
FIG. 3 is a plot illustrating the thermo-mechanic behavior of the memory shaped metals being governed by a phase transformation between the austenite and the martensite.

FIG. 3 is a plot illustrating the thermo-mechanic behavior of the memory shaped metals being governed by a phase transformation between the austenite and the martensite. In FIG. 3, ξ(T) represents the martensite fraction. The difference between the heating transition and the cooling transition gives rise to hysteresis where some of the mechanical energy is lost in the process. The shape of the curve depends on the material properties of the shape-memory alloy, such as the alloy's composition and work hardening.

Referring to FIG. 3, memory metals, such as NiTi alloys, change from austenite to martensite upon cooling starting from a temperature below Ms. Mf is the temperature at which the transition to martensite completes upon cooling. Accordingly, during heating As and Af are the temperatures at which the transformation from martensite to austenite starts and finishes.

Applying a mechanical load to the martensite leads to re-orientation of the crystals or "de-twinning" which results to a deformation, which is not recovered (remembered) after releasing the mechanical load. Detwinning starts at a certain stress σs and ends at σf above which martensite continue exhibiting only elastic behavior (as long as the load is below the yield stress). The memorized deformation from detwinning is recovered after heating to austenite.

The phase transformation from austenite to martensite can also occur at constant temperature by applying a mechanical load above a certain level. The transformation is reversed when the load is released.

The transition from the martensite phase to the austenite phase is only dependent on temperature and stress, not time, as most phase changes are, as there is no diffusion involved. Similarly, the austenite structure receives its name from steel alloys of a similar structure. It is the reversible diffusionless transition between these two phases that results in the memory shape properties.

The shape memory effect (SME) occurs because a temperature-induced phase transformation reverses deformation, as shown in FIG. 3. The martensitic phase is monoclinic or orthorhombic (B19' or B19). Since these crystal structures do not have enough slip systems for easy dislocation motion, they deform by twinning—or rather, detwinning.

Martensite is thermodynamically favored at lower temperatures, while austenite (B2 cubic) is thermodynamically favored at higher temperatures. Since these structures have different lattice sizes and symmetry, cooling austenite into martensite introduces internal strain energy in the martensitic phase. To reduce this energy, the martensitic phase forms many twins—this is called "self-accommodating twinning" and is the twinning version of geometrically necessary dislocations. Since the shape memory alloy will be manufactured from a higher temperature and is usually engineered so that the martensitic phase is dominant at operating temperature to take advantage of the shape memory effect, memory metals "start" highly twinned.

When the martensite is loaded, these self-accommodating twins provide an easy path for deformation. Applied stresses will detwin the martensite, but all of the atoms stay in the same position relative to the nearby atoms—no atomic bonds are broken or reformed (as they would be by dislocation motion). Thus, when the temperature is raised and austenite becomes thermodynamically favored, all of the atoms rearrange to the B2 structure which happens to be the same macroscopic shape as the B19' pre-deformation shape. This phase transformation happens extremely quickly and gives SMAs their distinctive "snap".

Repeated use of the shape-memory effect may lead to a shift of the characteristic transformation temperatures (this effect is known as functional fatigue, as it is closely related with a change of microstructural and functional properties of the material). The maximum temperature at which a memory metal can no longer be stress induced is called Md, where the SMAs are permanently deformed.

In one example, a memory metal alloy has an original crystal structure. Then metal is deformed and causes a different crystal structure to form. Depending on the alloy, heat energy or magnetic energy is applied and the metal goes back to its original crystal structure. The heat energy or magnetic energy is a "transition element". Unlike most crystal structure changes in metals, this crystal structure change does not require diffusion.

Embodiments are described herein, in which the memory metal support beams 50 employ either a one way memory effect or a two way memory effect. In one embodiment, a one way memory effect is when a shape-memory alloy is in its cold state (below As). In this example, the metal can be bent or stretched and will hold those shapes until heated above the transition temperature. Upon heating, the shape changes to its original. When the metal cools again, it will retain the shape, until deformed again.

In one embodiment, a two-way memory effect is the effect that the material remembers two different shapes: one at low temperatures, and one at the high temperature. A material that shows a shape-memory effect during both heating and cooling is said to have two-way shape memory. The memory metal of the memory metal support beams 50 may also be referred to as a shape-memory alloy (SMA), smart metal, muscle wire, or smart alloy.

In one embodiment, an electrical connector is provided that includes a cantilever beam 55 having a contact portion 57 for engaging a pin structure 75 and a non-contact portion 56 that is mechanical support with the contact portion 55. The cantilever beams 55 may be composed of an electrically conductive material. Some examples of electrically conductive materials that may be suitable for the cantilever beams 55 include copper, aluminum, gold and combinations thereof. The contact portion 57 may have an apex that is configured to be the contact surface with the pin structure 75. For example, when an electrical contact include two cantilever beams 55, the apex's of the contact portions 57 should be positioned facing one another to provide the minimum distance between the separated cantilever beams 55 prior to the insertion of the pin structure 75 into engagement with the cantilever beams.

The non-contact portion 56 can be a continuous part of the contact portion 57, wherein the difference in the structures being that the non-contact portion 56 does not directly contact the pin structure 75. By "mechanical support" it is meant that the non-contract portion 56 provides the portion of the cantilever beam that is engaged to the housing 58 of the connector, and therefore connects the contact portion 57 to the housing 58.

Figure 4:
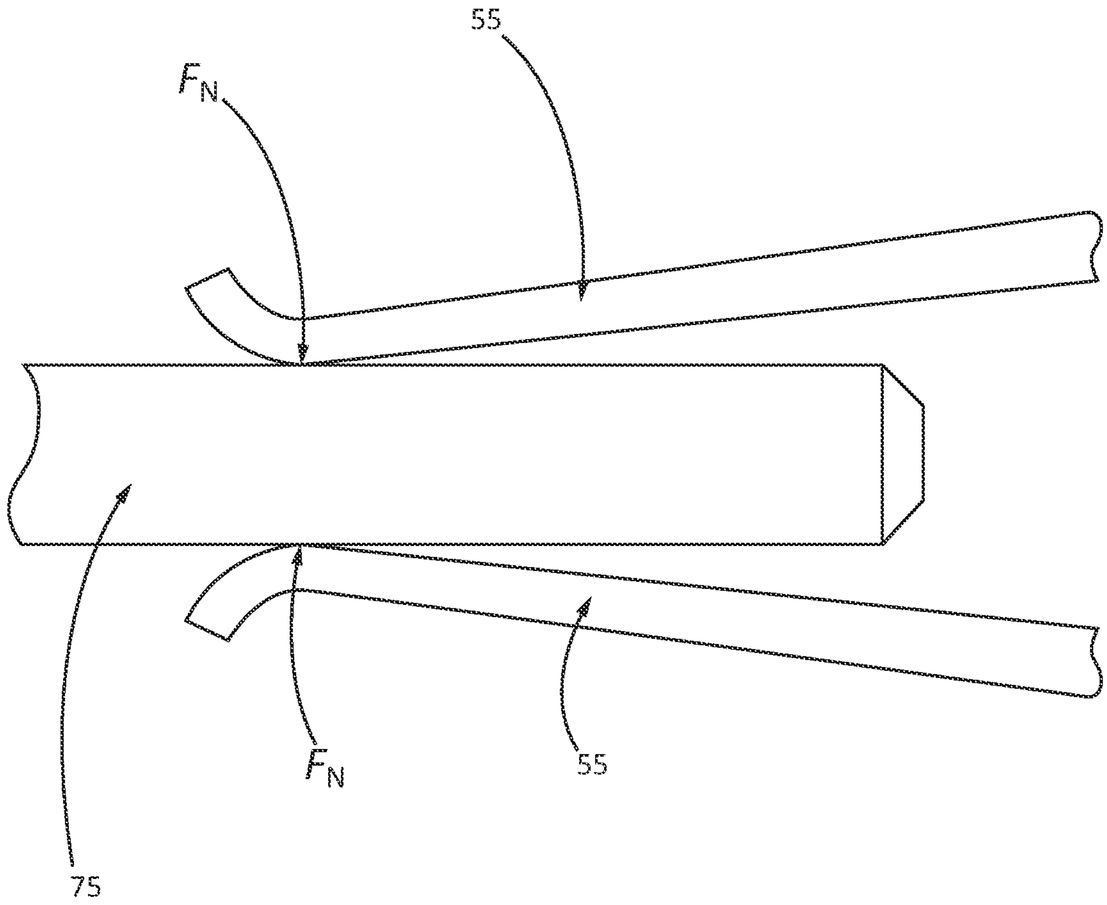
FIG. 4 is a side cross-sectional view illustrating a pin connector engaged to a cantilever beam contact, in which the normal force Fn is depicted being exerted upon the pin connector through the contract portions of the cantilever beams.

FIG. 2 illustrates the pin connector 75 (a male connector) being inserted between two cantilever beams 55 that are configured to as a female connector. The cantilever beam 55 deflects upon insertion of the pin connector 75, in which the direction of the deflection is opposite the normal force Fn. The normal force Fn is depicted being exerted upon the pin connector 75 through the contract portions 57 of the cantilever beams 55, as illustrated in FIG. 4.

Referring to FIGS. 1 and 2, the electrical connector 100 further includes an insulated memory metal support beam 50 that is positioned adjacent to the non-contact portion 56 of cantilever beam 55. In some embodiments, the insulated memory metal support beam 50 transitions from a first geometry as depicted in FIG. 1, to a second geometry as depicted in FIG. 2, with the application of a transition element. The first geometry of the insulated memory metal support beam 50 that is depicted in FIG. 1 provides that the insulating memory metal support beam does not engage the non-contact portion 56 of the cantilever beams 55. The second geometry of the insulated memory support beam 50 that is depicted in FIG. 2 contacts the non-contact portion 56 of the cantilever beams 55 producing a force that supports the contact portion 57 of the cantilever contacts in a manner that reinforces the normal force.

In one embodiment, the insulated memory metal support beam 50 transitions from a first geometry having a first curvature that does not engage the non-contact portion of the cantilever beams 55. In the embodiment depicted in FIG. 1, the first curvature is substantially linear, e.g., linear. However, this is only one embodiment, and a minor curvature may be present, so long as the insulated memory metal support beam 50 does not contact the cantilever beams 55 when the insulated memory metal support beam 50 has the first geometry. Referring to FIG. 2, the second curvature for the second geometry of the insulated metal support beam 50 is greater than the first curvature for the first geometry of the insulated metal support beam 50 that is depicted in FIG. 1. The second curvature of the memory support beam contacts 50 directly contacts the non-contact portion of the cantilever beam 50.

The transition element that causes the change between the two geometries illustrated in FIGS. 1 and 2 may be the application of heat or a magnetic field or a combination of head and magnetic fields. The transition element triggers a phase transformation in the memory metal of the insulated memory metal support beam 50. For example, the insulated memory metal support beam 50 have an original crystal structure having the geometry, i.e., second geometry, depicted in FIG. 2. The metal during manufacturing may be deformed, which can cause a different crystal structure to form. This could result in the first geometry that is depicted in FIG. 1. Depending on the alloy that is used for the composition of the insulated metal support beam, heat energy or magnetic energy is applied and the metal goes back to its original crystal structure, i.e., the second geometry that is depicted in FIG. 2. The above description of transitions between the first and second geometries depicted in FIGS. 2 and 1, respectively, is an example of a one way memory effect. Two way memory effects are equally applicable depending upon the alloy composition selected for the insulated memory metal support beams 50.

The metal composition of the memory metal support beam 50 can be any composition that has been provided above in the description of memory metals. For example, the memory metal that is employed in the insulated memory metal support beam 50 can selected from the group consisting of nickel titanium alloys, copper-aluminum-nickel alloys and combinations thereof. In another embodiment, the metal composition of the memory metal support beam 50 is an alloy of elements selected from the group consisting of zinc, copper, gold, iron and combinations thereof. In one example, the memory metal composition of the insulated memory metal support beam 50 is Nitonol. NiTi alloys (Nitinol) may contain 45% titanium and 55% nickel.

The memory metal support beam 50 is insulated to reduce the possibility of interference with the cantilever beams 55. The memory metal component of the insulated memory metal support beam 50 may be in an insulating jacket having a composition selected from the group consisting of polyvinyl chloride (PVC), cross-linked polyethylene (XLPE), fluoroplastics, rubber, ethylene-propylene rubber, silicone rubber insulation and combinations thereof.

The designs illustrated in FIGS. 1 and 2 can provide a memory metal beam 50 that is in non-engaging position until heated when it moves into a support/force application position for the main cantilever electrical contact. Nitinol can be one metal alloy suitable for the memory metal beam 50 because the memory material properties, e.g., temperature for the transition element, are from −180 to 120° C. depending on the alloying metallurgy. The memory metal for the memory metal beam 50 can be shaped at elevated temperatures. The type of connector application defines what shape memory to use. In some examples, for press-fit applications only one-way memory effects are needed. In some examples, for connectors that see soldering/reflow temperatures then two-way memory effects may be needed. For example, two-way effected memory metal can be used to release connectors when unplugging application is required. Multiple methods to attach the memory metals to the connectors could be employed, such as heatstaking, adhesives, mechanical molding features.

In some embodiments, the geometries for the insulated memory metal support beams can use simple metal arc/radial beams for the shaping of the memory metals, but other shapes could be done. The shape can be constructed so as to interfere with connector housing 58 for additional support.

Actuation of the memory metal can take place any time after installation. For example, when connectors are used for a long period of time and there is a loss of contact normal force—the connector can be heated to actuate the memory metal to improve the retention force for further connector use.

Figure 5:
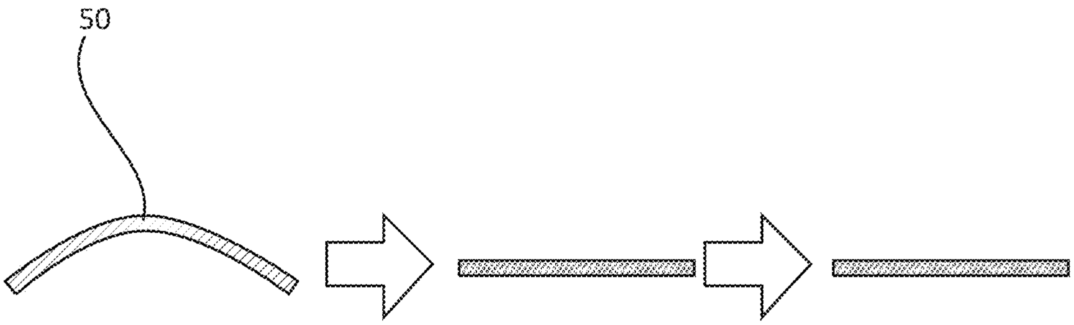
FIG. 5 is a flow diagram illustrating one embodiment of a process sequence for forming the memory metal for installation into a housing.

FIG. 5 illustrates one embodiment of a process sequence for forming the memory metal for installation into a housing. This sequence may be performed at the connector vendor. For example, a memory metal composition alloy may be selected and heated to a temperature for shaping the memory metal. For example, the memory metal may be shaped to the second geometry that is depicted in FIG. 2, which would be the geometry for an insulated memory metal support beam 50 for applying a reinforcing force to the normal force of the cantilever beam 55. The machined and shaped memory metal is depicted by reference number 48 in FIG. 5. In a subsequent step, the memory metal may be cooled and deformed to the first geometry, as depicted in FIG. 1. This step is illustrated by reference number 49 in FIG. 5. In a following step, the memory metal, which is now in the first geometry for the memory metal support beam, is coated with an insulating material to provide the insulated memory metal support beam 50, as depicted in FIG. 5.

FIGS. 6-9 illustrate one embodiment of integrating the insulated memory metal support beam 50 into a process sequence using a backplane connector application. Often referred to simply as a backplane, this type of printed circuit board (PCBs) is used as a support structure for connecting with other printed circuit boards (PCBs). The backplane connector adds mechanical strength and stability while also acting as a plane for integrating other system components called daughterboards. Daughterboards are connected to the backplane to perform different functions.

Broadly the method may include positioning an insulated memory metal support beam 55 adjacent to the non-contact portion 56 of a cantilever beam 55, wherein the cantilever beam 55 includes a contact portion 57 for engaging a pin structure 75 that is mechanically supported by the non-contact portion 56. The method may further include engaging the pin structure 75 to the contact portion 57 of the cantilever beam 55, wherein engagement of the pin structure 75 to the contact portion 57 includes inducing a normal force from the cantilever beam 55 on the pin structure 75. Finally, the method may include applying a transition element, e.g., heat and/or magnetic field, to the insulated memory metal support beam 50. The transition element induces a geometry change in the insulated memory metal support beam 50 that causes the insulated memory metal support beam 50 to apply a force to the cantilever beam 55 that reinforces the normal force on the pin structure 75. The method is now described with greater detail with reference to FIGS. 6-9.

Figure 6:
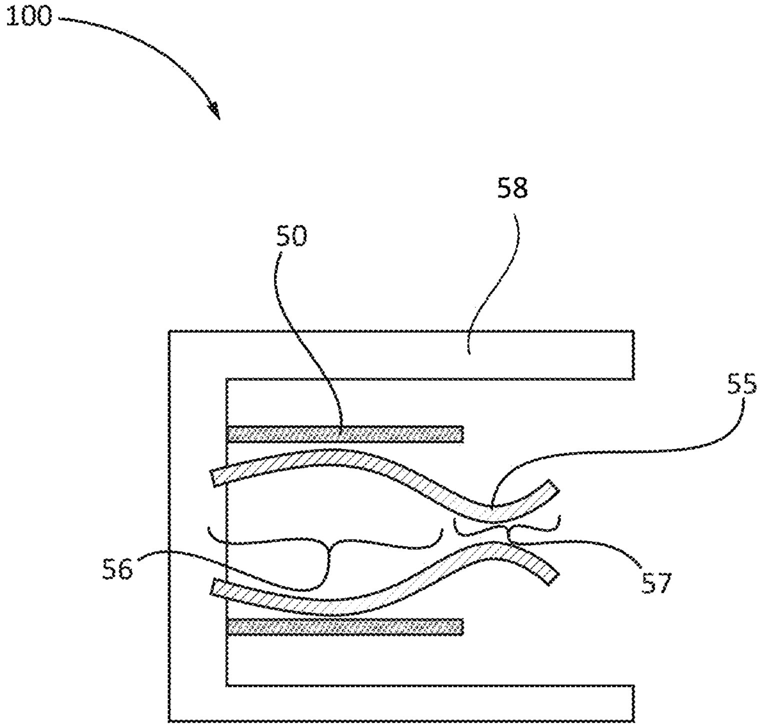
FIG. 6 is a side cross-sectional view illustrating one embodiment of insulating memory metal support beams being installed into a housing with cantilevers in a backplane connector application.

FIG. 6 illustrates one embodiment of insulating memory metal support beams 50 being installed into a housing 58 with cantilever beams 50 in a backplane connector application. In one embodiment, one end of the insulating memory metal support beams 50 are stacked/attached to the housing 58 so that the insulating metal support beams 50 are near the cantilever beams, which are the mating features. In some embodiments, it is important that the insulating memory metal support beams 50 be on the side of the cantilever beam 55 that does not interfere with the engagement of the pin element to the contact surfaces 57 of the cantilever beam 55.

Figure 7:
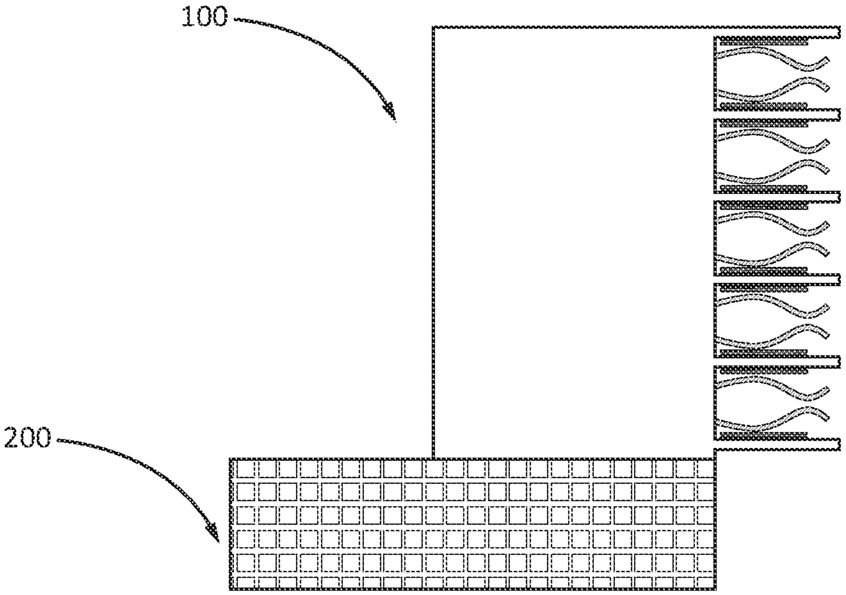
FIG. 7 is a side cross-sectional view illustrating one embodiment of a housing including a plurality of cantilever contacts with a memory metal support beams being press fit onto a printed circuit board assembly (PCBA).

FIG. 7 illustrates one embodiment of a housing 58 including a plurality of cantilever contacts (including cantilever beams 55) with insulating memory metal support beams 50 being press fit onto a printed circuit board assembly (PCBA) 200. A printed circuit board assembly (PCBA) describes the finished board after all the components have been soldered and installed on a printed circuit board (PCB). The conductive pathways engraved in the laminated copper sheets of PCBs are used within a non-conductive substrate in order to form the assembly.

Figure 8:
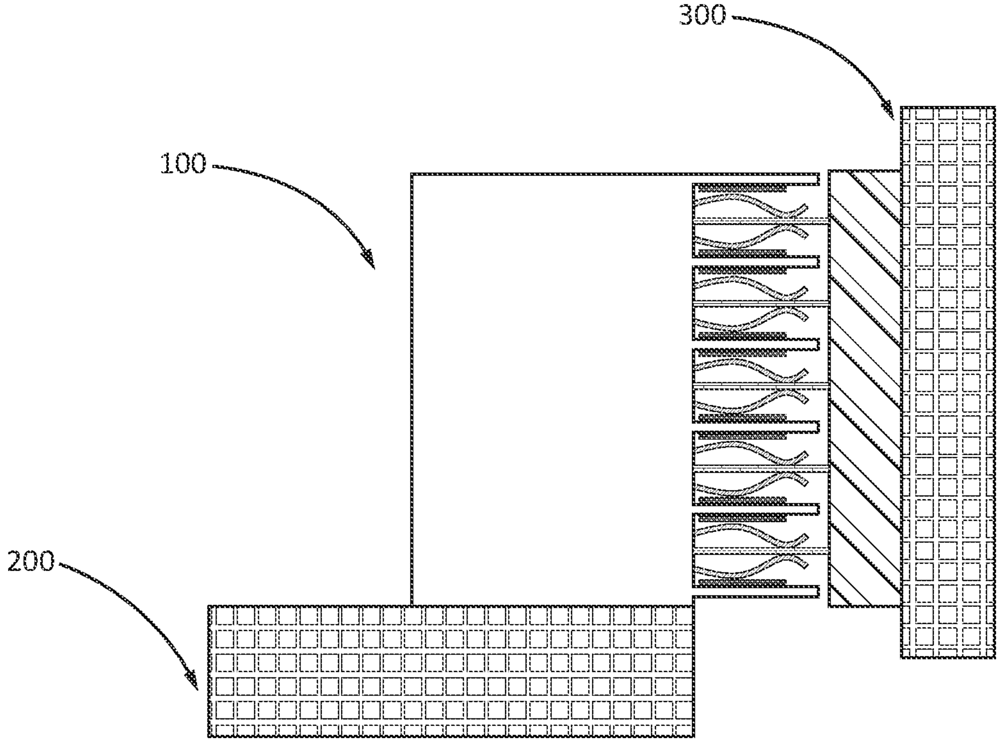
FIG. 8 is a side cross-sectional view illustrating one embodiment of mating the connectors from the assembly including the PCBA depicted in FIG. 7 to a Central Electronic Complex (CEC) component of a mainframe.

FIG. 8 illustrates one embodiment of mating the connectors from the assembly including the PCBA depicted in FIG. 7 to a central electronic complex (CEC) component of a mainframe 300. The CEC (Central Electronic Complex) includes a set of hardware that can defines a mainframe, which includes the CPU(s), memory, channels, controllers and power supplies included in the box. Some CECs include data storage devices as well.

Figure 9:
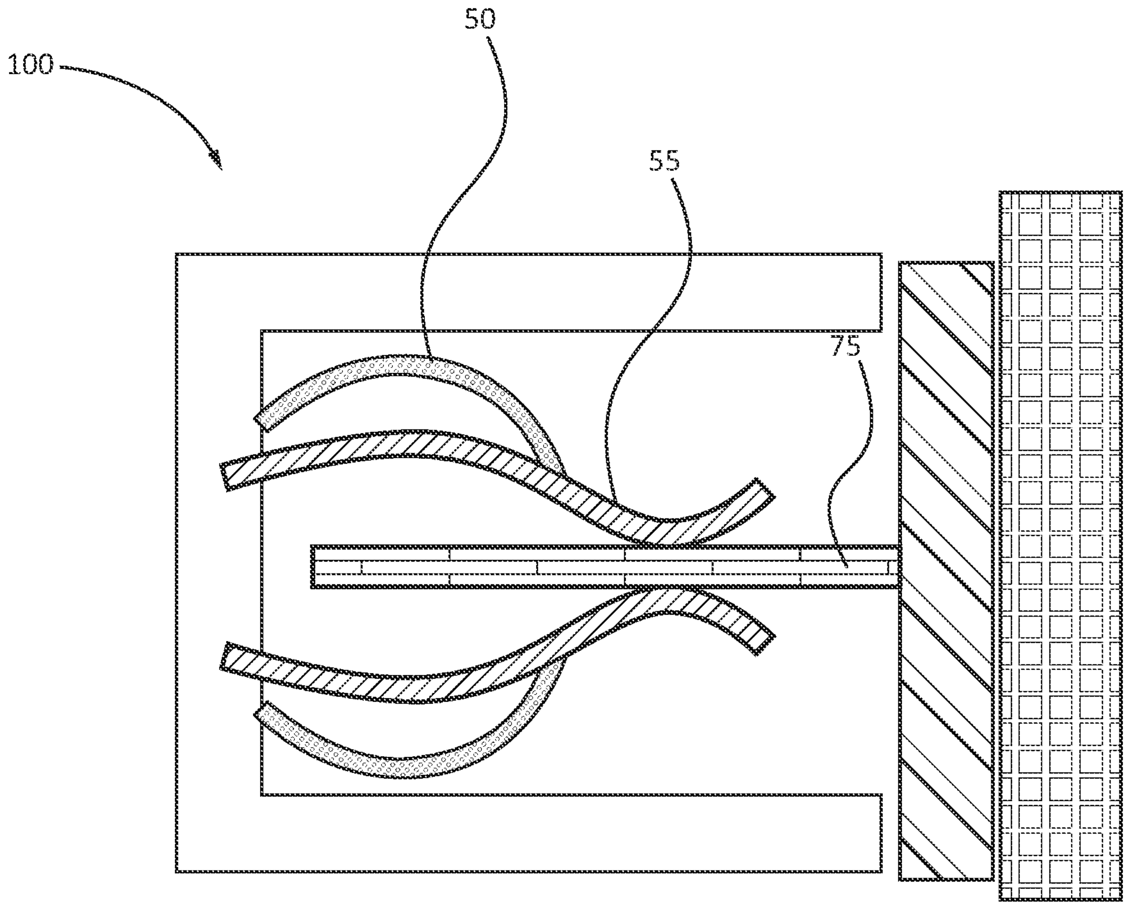
FIG. 9 is a side cross-sectional view illustrating applying a transition element to the insulated memory metal support beams to cause a geometry change in the support beams that reinforces the normal force of the cantilever beams, in accordance with one embodiment of the present disclosure.

FIG. 9 illustrates one embodiment of applying a transition element to the insulated memory metal support beams 50 to cause a geometry change in the support beams, i.e., insulated memory metal support beams 50, that reinforces the normal force of the cantilever beams 55. In one embodiment, applying the transition element to the insulated memory metal support beam 50 induces a geometry change in the insulated memory metal support beam 50 that causes the insulated memory metal support beam 50 to apply a force to the cantilever beam 55 that reinforces the normal force on the pin structure 75. In some examples, the geometry change is a change in curvature of the insulated memory metal support beam 50 so that the insulated memory metal support beam directly contacts the cantilever beam 55. The method depicted in FIG. 9 is an example of where the transition element results in a one way memory effect.

FIGS. 10-13 illustrate one embodiment of a method for reinforcing the normal force in a cantilever beam contact 55 using a memory metal support beam 50 that experiences a geometry change in response to the application of a transition element, in which the transition element is two transition temperatures that results in a two way memory effect.

Figure 10:
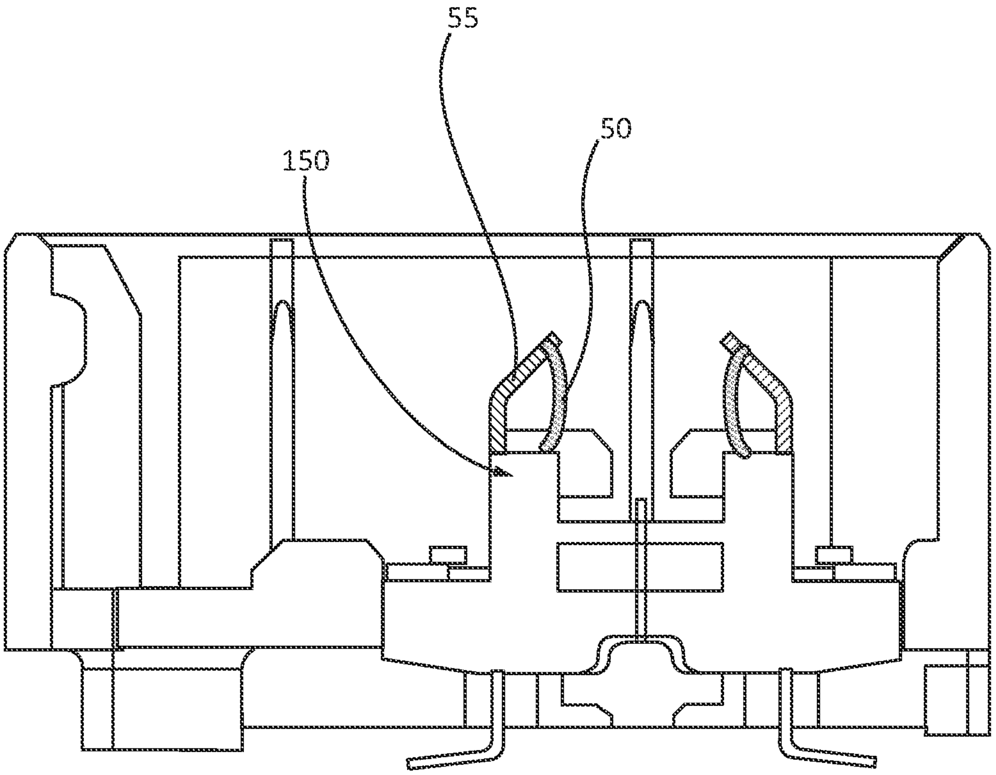
FIG. 10 illustrates one embodiment of a method for reinforcing the normal force in a cantilever beam contact using a memory metal support beam that experiences a geometry change in response to the application of a transition element, in which the transition element is two transition temperatures that results in a two way memory effect, in accordance with one embodiment of the present disclosure.

The method illustrated as beginning in FIG. 10 stars with inserting insulated memory metal support beams 50 into a mating receptacle 150. The mating receptable receiving the memory metal support beams 50 further includes the cantilever beam contact 55, in which the memory metal support beams 50 are positioned adjacent to a non-contact portion of the cantilever beam contact 55. The mating receptacle is similar to the above description of the housing 58. The insulated memory metal support beams 50 are manufactured using the method that has been described above with reference to FIG. 5. The insulated memory metal support beams 50 are configured in a first geometry similar to the geometry of the insulated metal support beams 50 that are depicted in FIG. 1.

Figure 11:
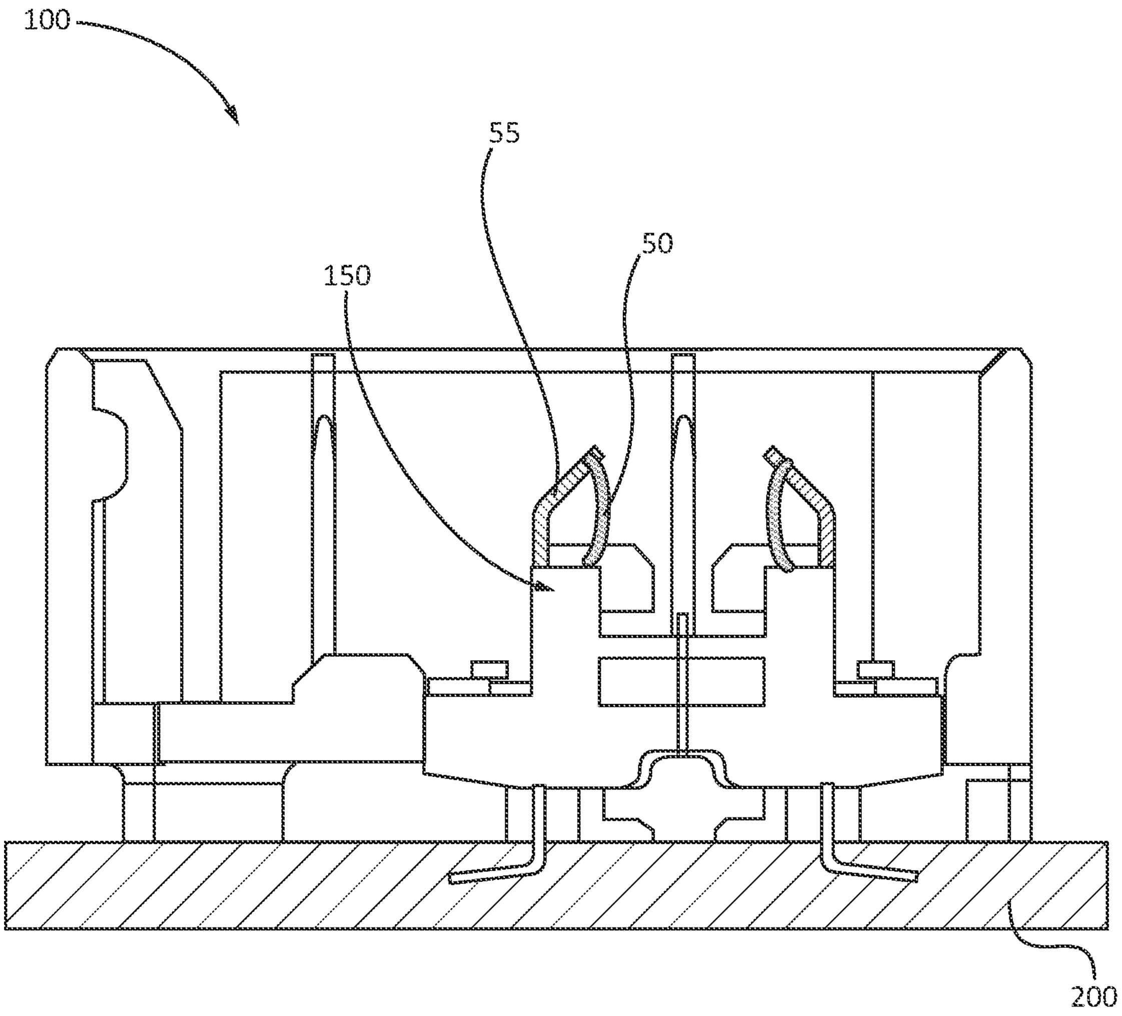
FIG. 11 is a side cross-sectional view illustrating the application of solder heat to apply the cantilever beam receptacle 150 to a printed circuit board (PCB), in accordance with one embodiment of the present disclosure.

FIG. 11 illustrates the application of solder heat to apply the cantilever beam receptacle 150 to a printed circuit board (PCB) 200. This is a solder bonding application. The application of the solder heat to the cantilever beam receptacle 150 is a first application of a transition element, i.e., the application of heat that causes a change in the geometry of the insulated memory metal support beams 50. More specifically, during solder reflow the memory metal structures, i.e., insulating memory metal support beams 50, actuate and apply a force to mating contacts, i.e., cantilever contact beams 55. FIG. 2 illustrates one embodiment of an insulating memory metal support beam that has gone through a transformation in geometry into a state in which the metal support beam 50 is contacting a cantilever beam 55, and supporting the cantilever beam 55.

Figure 12:
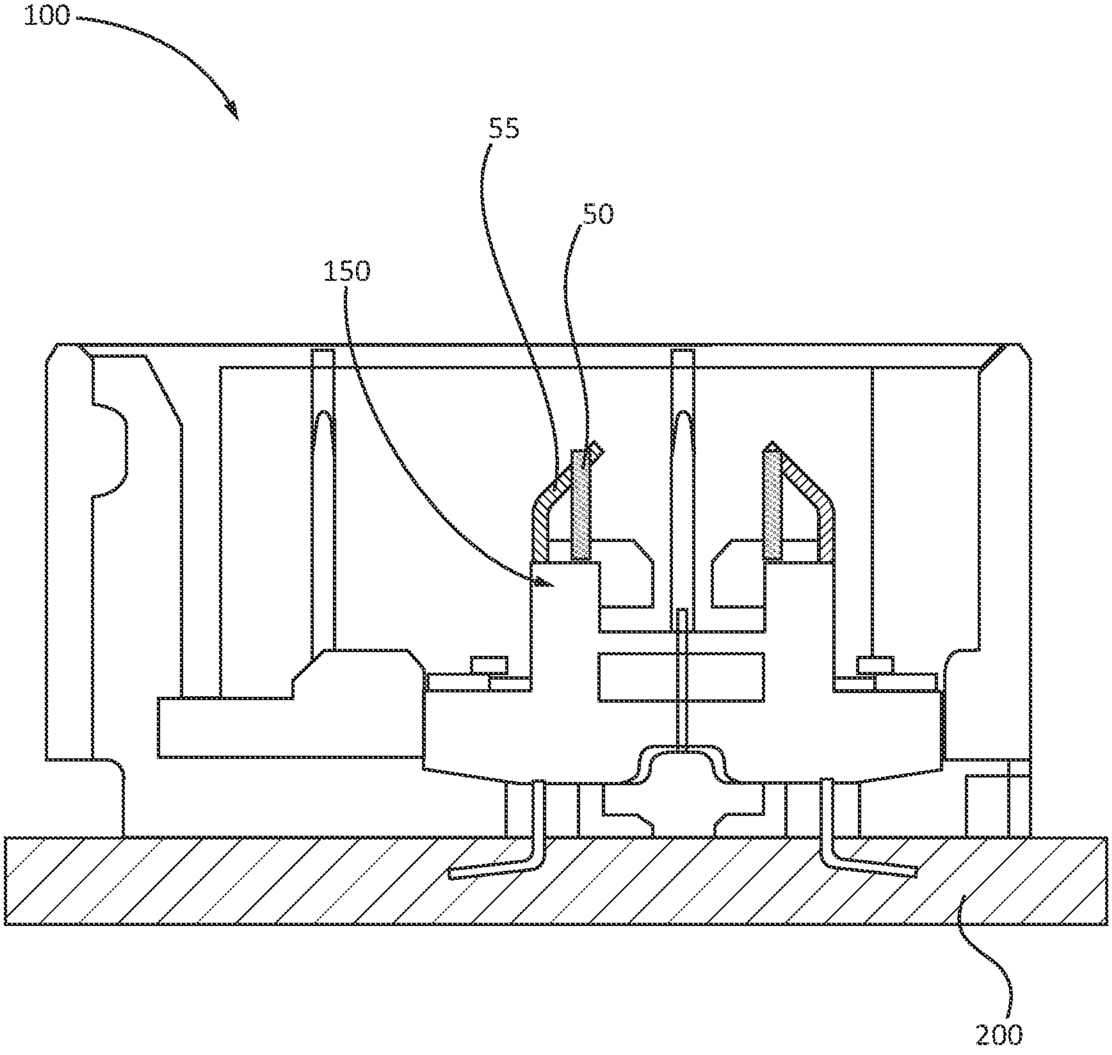
FIG. 12 is a side cross-sectional view illustrating a cantilever beam receptacle bonded to a printed circuit board (PCB) post reflow operations, as the structure cools to room temperature, in accordance with one embodiment of the present disclosure.

FIG. 12 illustrates a cantilever beam receptacle 150 bonded to a printed circuit board (PCB) post reflow operations, as the structure cools to room temperature (e.g., 20° C. to 25° C.). As the structure cools post reflow, the insulated memory metal support beams experience a change in geometry back to their original shape, as illustrated in FIG. 1.

Figure 13:
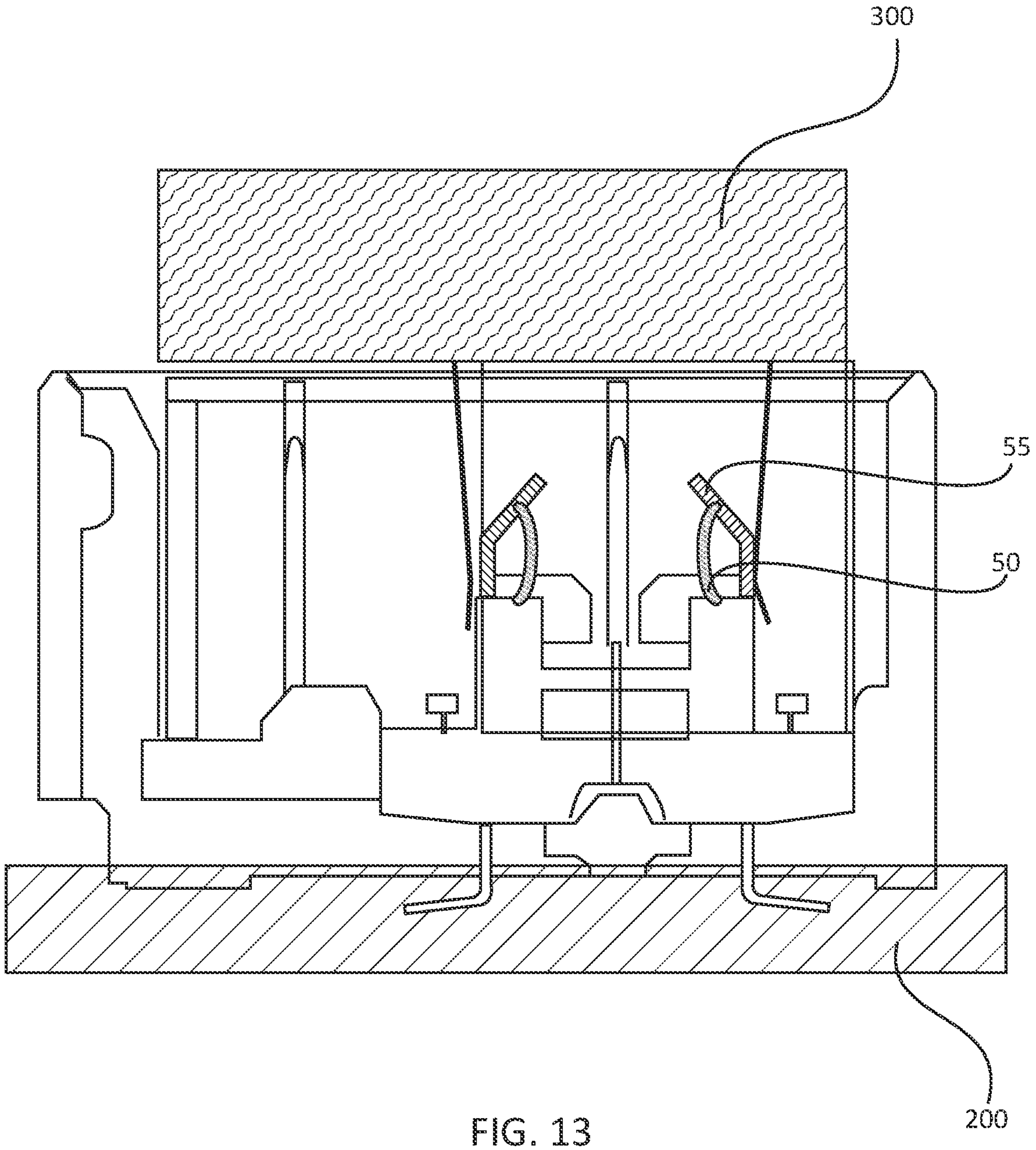
FIG. 13 is a side cross-sectional view illustrating a cantilever beam receptacle plugged into a pin.

FIG. 13 illustrates the cantilever beam receptacle 150 having a plug with pin contacts inserted into the receptacle 150. The cantilever beam receptacle 150 depicted in FIG. 13 is following the application of the operational temperature. In this example, the operation temperature serves as a transition element. The operational temperature causes the insulating metal support beams 50 to change geometry into a support position similar to the geometry of the insulated metal support beams 50 depicted in FIG. 2. For example, in system operation, full force is applied by the memory metal to increase support, e.g., normal force, during mating. Thus, increasing overall normal force.

The method illustrated in FIGS. 10-13 is one example of the application of memory metals characterized with a two way memory effect. In one example, a memory metal composition suitable for application to the method illustrated in FIGS. 10-13 would be Nitinol alloy that morphs to shape at 35° C.-45° C.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. An electrical connector, comprising:

a housing;

a cantilever beam having a contact portion for engaging a pin structure and a non-contact portion that is mechanical support with the contact portion; and an insulated memory metal support beam positioned adjacent to the non-contact portion of the cantilever beam, the insulated memory metal support beam transitions from a first geometry to a second geometry with an application of a transition element, wherein the first geometry of the insulated memory metal support beam provides that the insulating memory metal support beam does not engage the non-contact portion of the cantilever beam, and the second geometry of the insulated memory metal support beam contacts the non-contact portion of the cantilever beam producing a force that supports the contact portion of cantilever contacts, wherein the cantilever beam and the insulated memory metal support beam extend in a same direction and from a same side of the housing.

2. The electrical connector of claim 1, wherein a metal composition of the insulated memory metal support beam is selected from the group consisting of nickel titanium alloys, copper-aluminum-nickel alloys, and combinations thereof.

3. The electrical connector of claim 1, wherein a metal composition of the insulated memory metal support beam is an alloy of elements selected from the group consisting of zinc, copper, gold, iron, and combinations thereof.

4. The electrical connector of claim 1, wherein a metal composition of the insulated memory metal support beam is an alloy characterized by a one way memory effect.

5. The electrical connector of claim 1, wherein a metal composition of the insulated memory metal support beam is an alloy characterized by a two way memory effect.

6. The electrical connector of claim 1, wherein an insulator for the insulated memory metal support beam is an insulating jacket having a composition selected from the group consisting of polyvinyl chloride (PVC), cross-linked polyethylene (XLPE), fluoroplastics, rubber, ethylene-propylene rubber, silicone rubber insulation, and combinations thereof.

7. The electrical connector of claim 1, wherein the first geometry has a first curvature, and the second geometry has a second curvature, wherein the second curvature is greater than the first curvature.

8. The electrical connector of claim 7, wherein the first curvature is substantially zero curvature.

9. An electrical contact structure comprising:

a housing;

deformable contacts having a contact portion for engaging a pin structure and a non-contact portion that is mechanical support for the contact portion; and a memory metal support beam is positioned adjacent to the non-contact portion of the deformable contacts, wherein the memory metal support beam transitions from a first geometry having a first curvature to a second geometry having a second curvature with an application of a transition element, in which the first curvature of the memory metal support beam does not engage the non-contact portion of the deformable contacts, and the second curvature of the memory metal support beam contacts the non-contact portion of the deformable contacts, wherein the deformable contacts and the memory metal support beam extend in a same direction and from a same side of the housing.

10. The electrical contact structure of claim 9, wherein a metal composition of the memory metal support beam is selected from the group consisting of nickel titanium alloys, copper-aluminum-nickel alloys, and combinations thereof.

11. The electrical contact structure of claim 9, wherein a metal composition of the memory metal support beam is an alloy of elements selected from the group consisting of zinc, copper, gold, iron, and combinations thereof.

12. The electrical contact structure of claim 9, wherein a metal composition of the memory metal support beam is an alloy characterized by a one way memory effect.

13. The electrical contact structure of claim 9, wherein a metal composition of the memory metal support beam is an alloy characterized by a two way memory effect.

14. The electrical contact structure of claim 9, wherein the first curvature is substantially zero curvature.

15. A method for reinforcing contacts in electrical connectors, the method comprising:

positioning an insulated memory metal support beam adjacent to a non-contact portion of a cantilever beam in a housing, wherein the cantilever beam includes a contact portion for engaging a pin structure that is mechanically supported by the non-contact portion, wherein the cantilever beam and the insulated memory metal support beam extend in a same direction and from a same side of the housing;

engaging the pin structure to the contact portion of the cantilever beam, wherein the engaging of the pin structure to the contact portion includes inducing a normal force from the cantilever beam on the pin structure; and applying a transition element to the insulated memory metal support beam, wherein the transition element induces a geometry change in the insulated memory metal support beam that causes the insulated memory metal support beam to apply a force to the cantilever beam that reinforces the normal force on the pin structure.

16. The method of claim 15, wherein the transition element is provided by heating the insulated memory metal support beam.

17. The method of claim 15, wherein the transition element is provided by applying a magnetic field to the insulated memory metal support beam.

18. The method of claim 15, wherein the geometry change is a change in curvature of the insulated memory metal support beam so that the insulated memory metal support beam directly contacts the cantilever beam.

19. The method of claim 15, wherein the transition element results in a one way memory effect.

20. The method of claim 15, wherein the transition element is two transition temperatures that results in a two way memory effect.

* * * * *